UNITED STATES PATENT OFFICE.

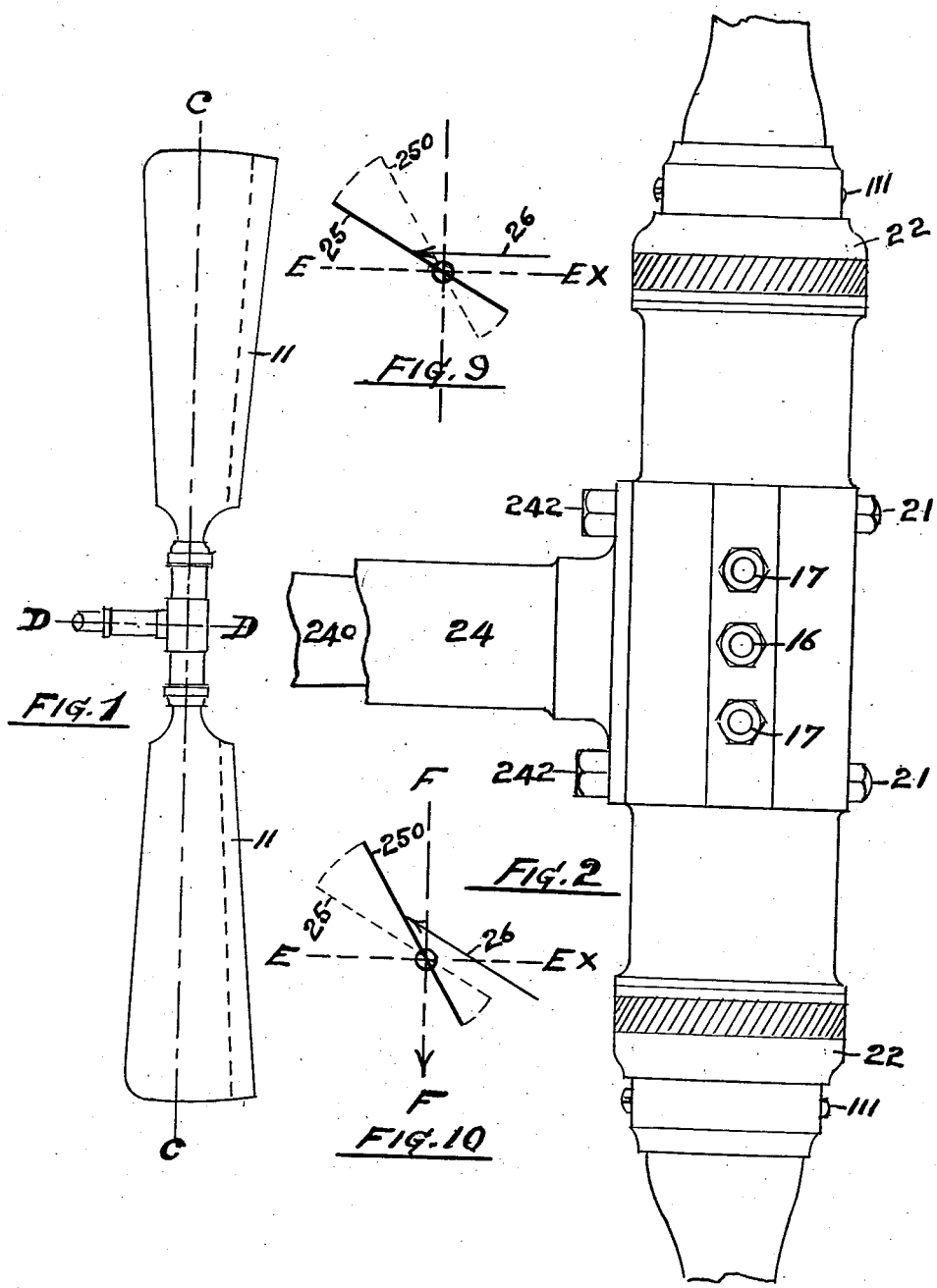

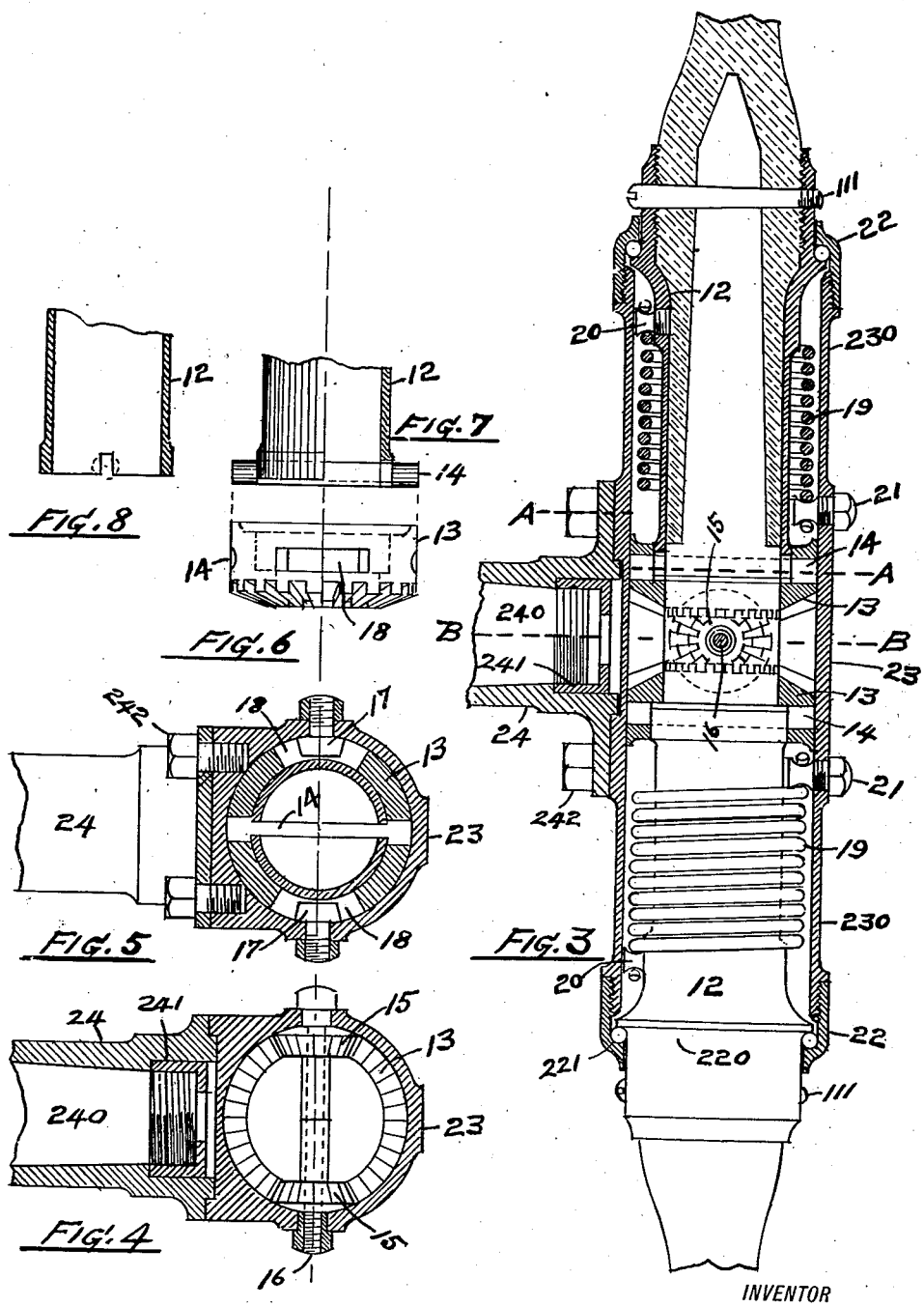

ROBERT YATES, OF PASSAIC, NEW JERSEY.

AEROPLANE-PROPELLER.

1,250,263.  Specification of Letters Patent.  Patented Dec. 18, 1917.

Application filed January 2, 1917. Serial No. 140,000.

*To all whom it may concern:*

Be it known that I, ROBERT YATES, a citizen of the United States, residing at Passaic, in the county of Passaic and State of New Jersey, have invented certain new and useful Improvements in Aeroplane-Propellers, of which the following is a specification.

This invention relates to propellers for flying machines, or boats, and the object is to produce a propeller, which will automatically vary the pitch of its blades to produce a nearly constant thrust at any speed of flight, also regulate the speed of the engine by turning the blades axially to that pitch angle, which produces constant aerial resistance to rotation, independent of changing currents of air or variation of speed of flight.

Referring to the drawings:

Figure 1 is a side view of the propeller.

Fig. 2 is a side view of the hub or stock of the propeller.

Fig. 3 is a longitudinal section of the hub or stock.

Fig. 4 is a cross section through Fig. 3 at B. B.

Fig. 5 is a cross section through Fig. 3 at A. A.

Fig. 6 is a side view of one of the gear rings of the equalizing gear.

Fig. 7 shows the pin that locks the sleeve to the gear ring.

Fig. 8 is a partial section of the sleeve, showing the slot that engages the pin in the gear ring.

Figs. 9 and 10 illustrate the turning movement of the blades, due to change of direction of air pressures.

In the drawings, the reference figures indicate the parts as follows:

11—11 are the blades, which, for illustration, are shown flat. These blades may be of any suitable metal, or of wood reinforced with steel, and are screwed into the sleeves, 12, as shown, then prevented from unscrewing from the sleeves by pins, 111.

12—12 are steel sleeves secured within the hub by ball thrust bearings on the end of each hub socket.

13—13 are gear rings in which the sleeves, 12, are seated.

14—14 are pins piercing the gear rings and engaging the sleeves, 12.

15—15 are pinions free to revolve on a pin piercing the center of the hub; these pinions engage the gear rings, 13, on opposite sides of the pinions, and together with the gear rings, constitute the equalizing gear, which causes the sleeves and blades to turn equally in opposite directions.

16 is the pin on which the pinions are mounted.

17—17 are stops which limit the turning movement of the gear rings, 13; sleeves, 12; and blades, 11.

18—18 are slots in the gear rings, 13, in which the stops, 17, operate to limit the turning movement of the gear rings, sleeves and blades.

19—19 are torsional springs, each of which acts to control the turning movement of the sleeves and blades in their reverse turning movement. These springs are provided with a hook at each end to engage studs in the sleeve and hub.

20—20 are studs screwed in the sleeves to engage hooks on the outer end of the torsional springs.

21—21 are studs screwed in the hub to engage hooks on the inner end of the torsional springs.

22—22 are ball thrust bearings, which serve to secure the sleeves, 12, and blades, 11, in the hub sockets and permit the blades to turn on their axis under great centrifugal force. These ball bearings are composed of ball raceways, 220, formed on the sleeves, with opposite raceways, 221, in ball cups, 22, and balls between the raceways; the ball cups 22 are screwed on the hub sockets 230.

23 is the hub with sockets, 230, in which the various working parts of the propeller are inclosed.

24 is a flanged sleeve coupling, coupling the propeller to the driving shaft, in which 240 is the nosing of the shaft and 241 is a cup nut, which secures the coupling to the shaft.

242—242 are tap bolts securing the hub and propeller to the sleeve coupling and driving shaft.

*Assembling the propeller.*

The pin, 16, with the pinions, 15, are fixed in place in the center of the hub; the gear rings with pins, 14, are slipped in the hub sockets on each side of the pinions and set in mesh on the pinions, so that the stop slots, 18, lie directly in line with each other; the stops are then inserted from within the hub and secured by nuts on the shanks of the stops outside the hub. The equalizing gear thus becomes self-contained.

The studs, holding the torsional springs, are then inserted in the hub and sleeves; the springs are then placed in the sockets and the sleeves introduced and given a quarter turn, to give tension to the springs, then pushed to place in the gear rings and engaging the pins, 14; the cups, 22, with balls in place, are then screwed firmly on the hub sockets. The entire operative mechanism of the hub thus becomes self-contained. The blades are now screwed into the sleeves, 12, and the pins, 11, inserted through the sleeve and shank of the blades and screwed tight in place.

*Operation.*

Referring to Fig. 1, it will be seen that the blades have a greater area on the following side of their axial center line, C. C., than upon the leading side, and when the propeller is rotated on the axis, D. D., the blades will turn on their axis, C. C., with a torque in proportion to the aerial pressure on the excess areas, 11—11, and cause one blade to turn one way and the other blade to turn in the opposite way. And as the blades are connected through equalizing gears, then this turning movement becomes equal but in opposite directions.

But torsional springs, 19—19, are provided to oppose this turning movement, and the blades will turn on the axis C. C., only until the tension on the torsional springs equals the torque of the blades.

By reference to Figs. 9 and 10, it will be further seen that the angle between the face of the blade and line of aerial pressure (due to rotation on the axis, D. D. Fig. 1) remains constant at any direction this line of aerial pressure may take. Let 25 and 250, Figs. 9 and 10, be an end view of a blade, and 26 be the line of aerial pressure, E—EX the plane of rotation of the blades, and F—F the line of flight. Then let the blade rotate from E to EX, Fig. 9, with the machine anchored in one position, the blade will then turn $x$ degrees with reference to the line of pressure, 26, and take the position, 25. Now let the machine be in flight along the line, F—F; the line of aerial pressure, 26, will then be the resultant diagonal between the speed of rotation of the blade and speed of flight as shown in Fig. 10, and the blade will take the position, 250, and the angle between the blade and line of pressure, 26, will be $x$ degrees as before. Then, as the angle of aerial pressure on the blade remains constant, so the resistance to rotation remains constant and the resultant force, F. F., or thrust, remains constant.

This action, originally advanced in theory, has been substantiated by experiment as follows:

Two propellers were made, having plain, flat wood blades and having their shanks connected through the hub by one torsional spring. Anticipating that trouble might arise from varying currents of air, one of these propellers was provided with equalizing gears. These propellers were tested on a stationary mounting in a large room, and here, both gave satisfactory results, the propeller, having no equalizing gears, worked equally as well as the propeller having gears. Tests were next made in the open air, on a large steel boom, which swung around a circle of about 300 feet circumference. The propeller, having no equalizing gears, was first tested. The air was quiet, no wind, and again this propeller worked satisfactorily, driving the boom around at high speed. This test was continued the following day in a high and variable wind. Now the vibration became so severe as to be dangerous to the structure. The speed of rotation of the propeller was slowed down, and it was then clearly seen that when one blade was rotating against the wind, its angle of pitch became acute, at the same time, the opposite blade rotating with the wind the angle of pitch became obtuse. This variation of the blades alternated with each rotation of the propeller, causing an increasing violent vibration. The propeller, provided with equalizing gears, was then mounted and tried in the same high variable wind. This propeller worked admirably and ran smoothly under all variations of wind pressure.

These experiments demonstrated two vital points: first, that the blades vary their pitch exactly in proportion to the aerial pressure, and secondly, that equalizing gears effectively equalize the varying pitch of the blades to a uniform average pitch, according to the average aerial pressure on both blades at any one instant.

These experiments were made in 1911 under careful supervision, and though a number of minor improvements were suggested, no serious mechanical difficulties were developed. Further experiments, to demonstrate the commercial possibilities, were, however, made in 1913 and a propeller built from improved designs and full specifications by average mechanics under the supervision of an average superintendent. The work was apparently well done, but during the first test, one of the blades was thrown from its socket under the great centrifugal force. This demonstrated that it would be dangerous to depend upon an average workman to fix wooden blades in steel sockets and particularly in the field, and some form of metal blade or wood blades reinforced with steel, must be used. The recent improvements in strength of aluminum alloys will probably meet the requirements, and to safeguard my invention, pending further experiments, I respectfully make the present application for United States patent.

Claims.

1. A propeller of the character described, comprising a hub, having symmetrically arranged radial sockets, blades having shanks swiveled one in each socket, each blade having an eccentric area on the following side of its axial center line, by which the rotation of the propeller produces an axial rotative movement of the blade; and a torsional spring secured to the shank of each blade and to their sockets to produce a resilient resistance and counteract on such turning movement, with means of conveying the turning movement of one blade to the other, but in an opposite direction, and means in the form of stops for limiting such turning movement.

2. An automatic variable pitch propeller, comprising the combination of a hub, having radial sockets, sleeves within the sockets free to turn on their axis therein, blades secured in the sleeves, said blades having an eccentric and greater area on the rear or following side than on the front or leading side of their axial line, by which they are caused to turn axially under pressure of the air; a torsional spring encircling each sleeve within its socket, one end of which spring is hooked on a stud on the sleeve and the other end hooked on a stud in the socket, which studs and spring control the axial turning movement of the blades; and slots on the inner ends of the sleeves to engage pins in the gear rings to lock the sleeves and blades to the equalizing gears; equalizing gears comprising pinions mounted on a pin piercing the center of the hub, and a geared ring in mesh with the pinions on each side of same, by which gear rings and pinions the axial turning movement of one blade is communicated to the other, but in an opposite direction; and stops fixed to the hub to operate within slots in the side of the gear rings, by which stops and slots the turning movement of the rings, sleeves and blades is limited.

3. In a propeller of the character described, gear for equalizing and limiting the axial turning movement of the blades, comprising pinions mounted on a pin piercing the center of the hub transversely, a geared ring in mesh with the pinions on each side of the same, so that when one ring turns to right the other ring turns to left, pins piercing the rings transversely to engage sleeves for the blades, slots in the gear rings to receive and coöperate with stops in the propeller hub to limit the turning movement of the gear rings.

4. In a propeller of the character described, gear for equalizing and limiting the axial turning movement of the blades, comprising pinions mounted on a pin piercing the center of the hub transversely, a geared ring in mesh with the pinions on each side of the same, so that when one ring turns to right the other ring turns to left, pins piercing the rings transversely to engage sleeves for the blades, slots in the gear rings to receive and coöperate with stops in the propeller hub to limit the turning movement of the gear rings, in combination with sleeves having slots cut in their inner ends to engage the transverse pins in the gear rings to lock the sleeves and blades to the equalizing gear.

5. In a propeller of the character described, gear for equalizing and limiting the axial turning movement of the blades, comprising pinions mounted on a pin piercing the center of the hub transversely, a geared ring in mesh with the pinions on each side of the same, so that when one ring turns to right the other ring turns to left, pins piercing the rings transversely to engage sleeves for the blades, slots in the gear rings to receive and coöperate with stops in the propeller hub to limit the turning movement of the gear rings, in combination with sleeves having slots cut in their inner ends to engage the transverse pins in the gear rings to lock the sleeves and blades to the equalizing gear; torsional springs between the sleeves and hub-sockets, one end of which is attached to the sleeve and the other end to the socket to control the turning movement of the sleeves, and means for securing the sleeves in the hub-sockets but permitting them to turn freely therein, and further means for securing the shanks of the blades within the sleeves.

In testimony whereof I affix my signature.

ROBERT YATES.